United States Patent
Dennes et al.

(10) Patent No.: US 10,106,626 B2
(45) Date of Patent: Oct. 23, 2018

(54) PRODUCTION OF POLY ALPHA-1,3-GLUCAN FORMATE FILMS

(71) Applicant: E. I. DU PONT DE NEMOURS AND COMPANY, Wilmington, DE (US)

(72) Inventors: T. Joseph Dennes, Parkesburg, PA (US); Debora Flanagan Massouda, Wilmington, DE (US); Vindhya Mishra, Wilmington, DE (US); Andrea M. Perticone, Clayton, DE (US)

(73) Assignee: EI DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/110,272

(22) PCT Filed: Jan. 15, 2015

(86) PCT No.: PCT/US2015/011551
§ 371 (c)(1),
(2) Date: Jul. 7, 2016

(87) PCT Pub. No.: WO2015/109066
PCT Pub. Date: Jul. 23, 2015

(65) Prior Publication Data
US 2016/0326269 A1    Nov. 10, 2016

Related U.S. Application Data

(60) Provisional application No. 61/928,616, filed on Jan. 17, 2014, provisional application No. 61/928,588, filed on Jan. 17, 2014.

(51) Int. Cl.
| | |
|---|---|
| *C08B 37/00* | (2006.01) |
| *C08J 5/18* | (2006.01) |
| *C08L 5/00* | (2006.01) |
| *C08L 5/08* | (2006.01) |
| *C09D 105/00* | (2006.01) |

(52) U.S. Cl.
CPC ............ *C08B 37/0009* (2013.01); *C08J 5/18* (2013.01); *C08L 5/00* (2013.01); *C08L 5/08* (2013.01); *C09D 105/00* (2013.01); *C08J 2305/00* (2013.01)

(58) Field of Classification Search
None
See application file for complete search history.

(56) References Cited

U.S. PATENT DOCUMENTS

| | | | |
|---|---|---|---|
| 2,478,425 A | 8/1949 | Herdle et al. | |
| 2,817,592 A | 12/1957 | Novak et al. | |
| 3,285,765 A | 11/1966 | Cannon | |
| 4,306,059 A | 12/1981 | Yokobayashi et al. | |
| 4,306,060 A | 12/1981 | Ikemoto | |
| 4,415,734 A | 11/1983 | Yabune et al. | |
| 4,501,886 A | 2/1985 | O'Brien | |
| 4,562,020 A | 12/1985 | Hijiya et al. | |
| 4,590,107 A | 5/1986 | Bridgeford | |
| 5,712,107 A | 1/1998 | Nichols | |
| 6,087,559 A | 7/2000 | Nichols | |
| 6,127,602 A | 10/2000 | Nichols | |
| 6,127,603 A | 10/2000 | Nichols | |
| 6,284,479 B1 | 9/2001 | Nichols | |
| 6,323,338 B1 | 11/2001 | Potter et al. | |
| 6,465,203 B2 | 10/2002 | Nichols | |
| 6,624,300 B2 | 9/2003 | Potter et al. | |
| 7,000,000 B1 | 7/2006 | O'Brien | |
| 8,013,148 B2 | 9/2011 | Takaha et al. | |
| 8,642,757 B2 | 2/2014 | O'Brien et al. | |
| 8,753,668 B2 | 6/2014 | Sedmak | |
| 8,828,689 B2 | 9/2014 | Caimi et al. | |
| 8,871,474 B2 | 10/2014 | Payne et al. | |
| 8,962,282 B2 | 2/2015 | Caimi et al. | |
| 9,034,092 B2 | 5/2015 | O'Brien | |
| 9,080,195 B2 | 7/2015 | O'Brien et al. | |
| 9,096,956 B2 | 8/2015 | Shiflett et al. | |
| 9,139,718 B2 | 9/2015 | Paullin et al. | |
| 9,175,423 B2 | 11/2015 | O'Brien et al. | |
| 9,212,301 B2 | 12/2015 | O'Brien et al. | |
| 9,278,988 B2 | 3/2016 | Kasat et al. | |
| 9,334,584 B2 | 5/2016 | O'Brien et al. | |
| 9,365,955 B2 | 6/2016 | Opper | |
| 9,403,917 B2 | 8/2016 | Kasat et al. | |
| 9,540,747 B2 | 1/2017 | O'Brien | |
| 2001/0051716 A1 | 12/2001 | Bengs et al. | |
| 2006/0134417 A1* | 6/2006 | Takaha | C08L 5/00 |
| | | | 428/400 |
| 2013/0087938 A1 | 4/2013 | O'Brien et al. | |
| 2013/0157316 A1 | 6/2013 | Caimi et al. | |

(Continued)

FOREIGN PATENT DOCUMENTS

| | | |
|---|---|---|
| CN | 1283633 A | 2/2001 |
| CN | 101545150 A | 9/2009 |

(Continued)

OTHER PUBLICATIONS

Ogawa et al, crystal structure of 1-3, alpha-d-glucan, 1980, fiber diffraction methods, pp. 353-361.*
CN102766220A Machine translation.
PCT International Search Report and Written Opinion for International Application No. PCT/US2013/076905 dated Feb. 25, 2014.
PCT International Search Report and Written Opinion for International Application No. PCT/US2014/044281 dated Sep. 11, 2014.
PCT International Search Report and Written Opinion for International Application No. PCT/US2015/010139 dated Apr. 13, 2015.
PCT International Search Report and Written Opinion for International Application No. PCT/US2015/011546 dated Apr. 13, 2015.

(Continued)

*Primary Examiner* — Melvin C. Mayes
*Assistant Examiner* — Stefanie J Cohen

(57) ABSTRACT

The present invention is directed toward a process for making poly alpha-1,3-glucan formate films. These films are translucent or transparent and can be used in packaging applications.

14 Claims, No Drawings

(56) References Cited

U.S. PATENT DOCUMENTS

| | | |
|---|---|---|
| 2013/0161562 A1 | 6/2013 | O'Brien et al. |
| 2013/0161861 A1 | 6/2013 | O'Brien et al. |
| 2013/0168895 A1 | 7/2013 | Opper |
| 2013/0196384 A1 | 8/2013 | Caimi et al. |
| 2013/0214443 A1 | 8/2013 | Shiflett et al. |
| 2013/0244287 A1 | 9/2013 | O'Brien et al. |
| 2013/0244288 A1 | 9/2013 | O'Brien et al. |
| 2013/0313737 A1 | 11/2013 | O'Brien |
| 2014/0087431 A1 | 3/2014 | Payne et al. |
| 2014/0113821 A1 | 4/2014 | Lehtovaara et al. |
| 2014/0179913 A1 | 6/2014 | Paullin et al. |
| 2014/0187766 A1 | 7/2014 | Kasat et al. |
| 2014/0187767 A1 | 7/2014 | Kasat et al. |
| 2014/0323715 A1 | 10/2014 | Kasat et al. |
| 2015/0126730 A1 | 5/2015 | O'Brien |
| 2015/0191550 A1 | 7/2015 | Mishra et al. |
| 2015/0225877 A1 | 8/2015 | O'Brien |
| 2015/0232785 A1 | 8/2015 | Paullin et al. |
| 2015/0353649 A1 | 12/2015 | Paullin et al. |
| 2016/0053061 A1 | 2/2016 | Durnberger et al. |
| 2016/0053406 A1 | 2/2016 | Durnberger et al. |
| 2016/0060792 A1 | 3/2016 | Durnberger et al. |
| 2016/0138195 A1 | 5/2016 | Roder et al. |
| 2016/0138196 A1 | 5/2016 | Roder et al. |
| 2016/0144065 A1 | 5/2016 | Roder et al. |
| 2016/0177471 A1 | 6/2016 | Kraft et al. |
| 2016/0251453 A1 | 9/2016 | Kasat et al. |
| 2016/0304629 A1 | 10/2016 | Kasat et al. |
| 2016/0311935 A1 | 10/2016 | Dennes et al. |
| 2016/0326269 A1 | 11/2016 | Dennes et al. |
| 2016/0333117 A1 | 11/2016 | Massouda et al. |
| 2016/0333157 A1 | 11/2016 | Massouda et al. |

FOREIGN PATENT DOCUMENTS

| | | |
|---|---|---|
| CN | 102766220 A | 11/2012 |
| JP | 2002535501 A | 10/2002 |
| TW | 504525 B | 10/2002 |
| WO | 0043580 A1 | 7/2000 |
| WO | 00/49052 A2 | 8/2000 |
| WO | 2005010093 A1 | 2/2005 |
| WO | 2013/036918 A2 | 3/2013 |
| WO | 2013/036968 A1 | 3/2013 |
| WO | 2013/052730 A1 | 4/2013 |
| WO | 2013096502 | 6/2013 |
| WO | 2013096511 | 6/2013 |
| WO | 2013/101854 A1 | 7/2013 |
| WO | 2013/177348 A1 | 11/2013 |
| WO | 2014099724 A1 | 6/2014 |
| WO | 2014/105696 A1 | 7/2014 |
| WO | 2014/105698 A1 | 7/2014 |
| WO | 2014161018 A1 | 10/2014 |
| WO | 2014161019 A1 | 10/2014 |
| WO | 2014165881 A1 | 10/2014 |
| WO | 2014/052386 A2 | 11/2014 |
| WO | 2014201479 A1 | 12/2014 |
| WO | 2014201480 A1 | 12/2014 |
| WO | 2014201481 A1 | 12/2014 |
| WO | 2014201482 A1 | 12/2014 |
| WO | 2014201483 A1 | 12/2014 |
| WO | 2014201484 A1 | 12/2014 |
| WO | 2015/069828 A1 | 5/2015 |
| WO | 2015094402 A1 | 6/2015 |
| WO | 2015095046 A1 | 6/2015 |
| WO | 2015095358 A1 | 6/2015 |
| WO | 2015/103531 A1 | 7/2015 |
| WO | 2015/109064 A1 | 7/2015 |
| WO | 2015/109164 A1 | 7/2015 |
| WO | 2015/123327 A1 | 8/2015 |
| WO | 2015/200589 A1 | 12/2015 |
| WO | 2015/200593 A1 | 12/2015 |
| WO | 2015/200596 A1 | 12/2015 |
| WO | 2015/200605 A1 | 12/2015 |
| WO | 2015/200612 A1 | 12/2015 |

OTHER PUBLICATIONS

PCT International Search Report and Written Opinion for International Application No. PCT/US2015/011551 dated Apr. 13, 2015.
PCT International Search Report and Written Opinion for International Application No. PCT/US2015/011724 dated Apr. 13, 2015.
PCT International Search Report and Written Opinion for International Application No. PCT/US2015/037622 dated Sep. 14, 2015.
PCT International Search Report and Written Opinion for International Application No. PCT/US2015/037628 dated Sep. 14, 2015.
PCT International Search Report and Written Opinion for International Application No. PCT/US2015/037634 dated Sep. 14, 2015.
PCT International Search Report and Written Opinion for International Application No. PCT/US2015/037646 dated Sep. 30, 2015.
PCT International Search Report and Written Opinion for International Application No. PCT/US2015/037656 dated Sep. 29, 2015.
Simpson et al., "*Streptococcus salivarius*", Microbiology 141:1451-1460, 1995).
Yui T et al, "Molecular and crystal structure of (1 -> 3)-alpha-d-glucan Triacetate" International Journal of Biological Macromolecules, Elsevier BV, NL, vol. 14, No. 2. Apr. 1, 1992 (Apr. 1, 1992), pp. 87-96.
Ogawa K et al: "X-Ray diffraction data for (I->3)-alpha-d-glucan", Carbohydrate Research, Pergamon, GB, vol. 75, Oct. 1, 1979 (Oct. 1, 1979), pp. Cl3-Cl6, XP026634670, ISSN: 0008-6215, DOI: 10.1016/S0008-6215(00)84664-9.
Ogawa K et al: "Crystal Structure of (1->3)-Alpha-D-Glucan", Water-Soluble Polymers: Synthesis, Solution Properties and Applications, American Chemical Society, Washington, DC, US.; No. 141, Jan. 1, 1980 (Jan. 1, 1980), pp. 353-362, XP002936532, ISBN: 978-0-541-23408-9.
Ogawa K et al: "Molecular and crystal structure of the regenerated form of (I->3)-alpha-d-glucan", International Journal of Biological Macromolecules, Elsevier BV, NL, vol. 3. No. I, Feb. 1, 1981 (Feb. 1, 1981), pp. 31-36, XP025215918, ISSN: 0141-8130, DOI: 10.1016/0141-8130(81)90021-0.
Ogawa K et al: "X-ray diffraction data for (I->3)-alpha-d-glucan triacetate", Carbohydrate Polymers, Applied Science Publishers, Ltd. Barking, GB, vol. 3, No. 4, Jan. 1, 1983 (Jan. 1, 1983) pp. 287-297, XP024147668, ISSN: 0144-8617, DOI: 10.1016/0144-8617(83)90026-7.
Ana Villares et al: "Structural Features and Healthy Properties of Polysaccharides Occurring in Mushrooms", Agriculture, vol. 2, No. 4, Dec. 18, 2012 (Dec. 18, 2012), pp. 452-471, XP055216839, ISSN: 2077-0472, DOI: 10.3390/agriculture2040452.
Andriy Synytsya et al: "Structural analysis of glucans", Annals of Translational Medicine, vol. 2, No. 2, Feb. 1, 2014 (Feb. 1, 2014), XP055216860, ISSN: 2305-5847, DOI: 10.3978/j.issn.2305-5839, Feb. 7, 2014.
Zhang et al. Dissolution and Regeneration of Cellulose in NaOH/Thiourea Aqueous Solution. J Polym Sci Part B: Polym Phys 40: 1521-1529,2002.
Zhang et al. Effects of urea and sodium hydroxide on the molecular weight and conformation of alpha-(1-3)-D-glucan from Lentinus edodes in aqueous solution. Carbohydrate Research 327 (2000) 431-438.
Applied Fibre Science, F. Happey, Ed., Chapter 8, E. Atkins, Academic Press, New York, 1979 (Book not included).
Cantarel et al., 'The carbohydrate-active enzymes database (CAZY): an expert resource for glycogenomics,' Nucleic Acids Research, 2009, vol. 37, Database Issue, pp. D233-D238.
Cerqueira et al., 'Optimization of sugarcane bagasse cellulose acetylation,' Carbohydrate Polymers, 2007, vol. 69, pp. 579-582.
Kiho et al., (1->3)-alpha-D-glucan from an alkaline extract of agrocybe cylindracea and antitumor activity of its 0-(carboxymethyl)ated derivatives, Carbohydrate Research, 1989, vol. 189, pp. 273-279.
Le Moigne et al., 'Physics of cellulose xanthate dissolution in sodium hydroxide-water mixtures: a rheo-optical study,' Cellulose Chem. Technol., 2010, vol. 44(7-8), pp. 217-221.
Ogawa et al., 'Conformation of (1-3)-to-glucan tribenzoate,' Biosci Biotech Biochem, 1993, vol. 57 (10), pp. 1663-1665.

(56) References Cited

OTHER PUBLICATIONS

Shida et al., 'A (1/AR3-)-Alpha-D-Glucan isolated from the fruit bodies of lentinus edodes,' Carbohydrate Research, 1978, vol. 60, No. 1, pp. 117-127.
Synytsya et al., 'Structural analysis of glucans,' Annals of Translational Medicine, Feb. 1, 2014, vol. 2, No. 2, 14 pages.
PCT International Search Report and Written Opinion issued for PCT/US2015/010139, dated Apr. 29, 2015.
PCT International Search Report and Written Opinion issued for PCT/US2013/076905, dated Feb. 25, 2014.
PCT International Search Report and Written Opinion issued for PCT/US2014/044281, dated Sep. 3, 2014.
PCT International Search Report and Written Opinion issued for PCT/US2013/076919, dated Feb. 25, 2014.
PCT International Search Report and Written Opinion issued for PCT/US2015/011546, dated Apr. 13, 2015.
PCT International Search Report and Written Opinion issued for PCT/US2015/011551, dated Apr. 13, 2015.
PCT International Search Report and Written Opinion issued for PCT/US2015/011724, dated Apr. 13, 2015.

\* cited by examiner

PRODUCTION OF POLY ALPHA-1,3-GLUCAN FORMATE FILMS

CROSS-REFERENCE TO RELATED APPLICATIONS

This invention claims the benefit of priority of U.S. Provisional Application No. 61/928,588, filed on Jan. 17, 2014, and 61/928,616, filed on Jan. 17, 2014, the entirety of which are herein incorporated by reference.

FIELD OF THE INVENTION

This invention relates to poly alpha-1,3-glucan formate films and poly alpha-1,3-glucan films and methods of their preparation.

BACKGROUND

Glucose-based polysaccharides and their derivatives can be of potential industrial application.

Cellulose is a typical example of such a polysaccharide and is comprised of beta-1,4-D-glycosidic linkages of hexopyranose units. Cellulose is used for several commercial applications such as in manufacture of fibers and films (cellophane). Cellulose for industrial applications is derived from wood pulp. Solutioning of wood pulp is a difficult procedure. For cellophane production the most commonly used process for dissolution of cellulose is the 'viscose process' where the cellulose is converted to cellulose xanthate made by treating a cellulose compound with sodium hydroxide and carbon disulfide. The cellulose xanthate solution is extruded into a coagulation bath, where it is regenerated upon coagulation to form a cellulose film. Cellophane film has several desirable attributes like clarity, barrier to oxygen, mechanical strength etc which has resulted in its application as a packaging film. However, the disadvantage is the use of this viscose process in cellophane manufacture, which involves toxic chemicals and significant environmental costs. In addition, cellulose films show poor moisture resistance. Cellulose-derivative films, specifically cellulose acetate films, are used when moisture resistance is required. A widely used process for the preparation of cellulose acetate as described in U.S. Pat. No. 2,478,425 A comprises (1) a pretreatment step (activating step) of mixing a cellulose material having a high α-cellulose content with a small amount of an acid, (2) an acetylating step of treating the pretreated cellulose material with a mixed acid of acetic anhydride, acetic acid and an acidic catalyst, such as sulfuric acid, to obtain primary cellulose acetate, (3) a ripening step of hydrolyzing, according to need, the primary cellulose acetate obtained by the acetylation step to obtain cellulose acetate or cellulose acetate having a higher acetylation degree and (4) a purifying step of separating and purifying the obtained cellulose acetate by precipitation, solid-liquid separation, washing and drying. This process has some significant concerns as described in U.S. Pat. No. 4,306,060. First, large energy requirements for cooling the reaction—the acetylation reaction is exothermic but the reaction should be carried out at a temperature lower than room temperature. Second, during the ripening step, a part of the acetic acid ester connected to the cellulose portion of primary cellulose acetate is hydrolyzed. During this step, however, the ether linkage of the cellulose main chain is liable to be broken by hydrolysis. This tendency is prominent when sulfuric acid, added as the acetylation reaction catalyst, is coupled with cellulose in a large amount, and an excessive reduction of the degree of polymerization results. In order to isolate sulfuric acid bonded to cellulose, while preventing reduction of the degree of polymerization, and to effect hydrolysis to a desired degree of acetylation, the hydrolysis is ordinarily conducted for a very long time at a temperature slightly higher than ambient temperature, but lower than 40° C. Third, a cellulose starting material having a very high quality and a high α-cellulose content should be used. In the case of wood pulp, there is a quality standard for the acetate grade wood pulp.

Films of cellulose acetate can be prepared by either by melt extrusion methods or by casting methods. For many reasons, however, films prepared by melt extrusion are generally not suitable for optical applications such as for protective covers and substrates in electronic displays. Rather, casting methods are almost exclusively used to manufacture films for optical applications. Casting methods involve first dissolving the polymer in an appropriate solvent to form a dope having a high viscosity, and then applying the viscous dope to a continuous highly polished metal band or drum through an extrusion die, partially drying the wet film, peeling the partially dried film from the metal support, and conveying the partially dried film through an oven to more completely remove solvent from the film.

Amongst polysaccharide polymers, glucan polymers, with alpha-1,3-glycoside linkages, have been shown to possess significant advantages. U.S. Pat. No. 7,000,000 disclosed preparation of a polysaccharide fiber comprising a polymer with hexose units, wherein at least 50% of the hexose units within the polymer were linked via alpha-1,3-glycoside linkages, and a number average degree of polymerization of at least 100. A glucosyltransferase enzyme from *Streptococcus salivarius* (gtfJ) was used to produce the polymer. The polymer alpha-1,3-glucan was acetylated in order to render the polymer soluble in the spinning solvent. The acetylated polymer was then dissolved in a mixture of trifluoro-acetic acid and dichloromethane. From this solution continuous, strong, fibers of glucan acetate were spun. These glucan acetate fibers can subsequently be de-acetylated to form fibers composed of alpha-1,3-glucan.

It would be desirable to make films composed of a polysaccharide alpha-1,3-glucan polymer which have properties comparable to cellophane, without the need for acetylation and subsequent de-acetylation. In addition, elimination of the use of hazardous chemicals such as carbon disulfide required for xanthation of cellulose would be desirable. In addition, it would be desirable to make films with properties comparable to cellulose acetate, without the need for a separate acetylation step.

SUMMARY

The present invention is directed toward a film comprising poly alpha-1,3-glucan formate.

The present invention is also directed toward a process for making a poly alpha-1,3-glucan formate film comprising: (a) dissolving poly alpha-1,3-glucan in a formic acid and water solvent composition to provide a solution of poly alpha-1,3-glucan formate; (b) contacting the solution of poly alpha-1,3-glucan formate with a surface; and (c) removing the solvent composition to form a poly alpha-1,3-glucan formate film.

In another embodiment, the present invention is directed toward a film comprising poly alpha-1,3-glucan.

The present invention is also directed toward a process for making a poly alpha-1,3-glucan film comprising: (a) dissolving poly alpha-1,3-glucan in a formic acid and water solvent composition to provide a solution of poly alpha-1,
3-glucan formate; (b) contacting the solution of poly alpha-
1,3-glucan formate with a surface; (c) removing the solvent
composition to form a poly alpha-1,3-glucan formate film;
and (d) removing the formate in the poly alpha-1,3-glucan
formate film to form the poly alpha-1,3-glucan film.

DETAILED DESCRIPTION

The term "film" used herein refers to a thin, visually continuous material.

The term "packaging film" used herein refers to a thin, visually continuous material partially or completely encompassing an object.

The terms "poly alpha-1,3-glucan", "alpha-1,3-glucan polymer" and "glucan polymer" are used interchangeably herein. Poly alpha-1,3-glucan is a polymer where the structure of poly alpha-1,3-glucan can be illustrated as follows (where n is 8 or more):

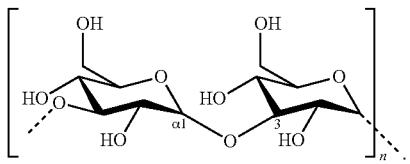

The term "glucan formate" refers to a derivatized form of poly alpha-1,3-glucan where at least one monomer in poly alpha-1,3-glucan has one or more hydroxyl groups of poly alpha-1,3-glucan that have reacted form a formate (—O—CHO), or may remain unreacted as a hydroxyl group.

This invention relates to poly alpha-1,3-glucan formate films and poly alpha-1,3-glucan films and the methods of their production from a polysaccharide poly alpha-1,3-glucan.

Poly alpha-1,3-glucan, useful for certain embodiments of the disclosed invention, can be prepared using chemical methods. Alternatively, it can be prepared by extracting it from various organisms, such as fungi, that produce poly alpha-1,3-glucan. Poly alpha-1,3-glucan useful for certain embodiments of the disclosed invention can also be enzymatically produced from renewable resources, such as sucrose, using one or more glucosyl-transferase (e.g., gtfJ) enzyme catalysts found in microorganisms as described in the co-pending, commonly owned U.S. Patent Application Publication No. 2013/0244288 which is herein incorporated by reference in its entirety.

A process for making a poly alpha-1,3-glucan formate film begins with dissolving poly alpha-1,3-glucan in a formic acid and water solvent composition to provide a solution of poly alpha-1,3-glucan formate. When poly alpha-1,3-glucan is contacted with concentrated formic acid, one or more hydroxyl groups of poly alpha-1,3-glucan react to form a formate (—O—CHO). The poly alpha-1,3-glucan formate thus formed dissolves in the same reaction mixture, resulting in a one-pot production of a casting solution composed of a derivatized polymer, starting with underivatized glucan and formic acid. The reaction proceeds even at room temperature. According to literature, cellophane raw material (wood pulp) does not readily react with formic acid to produce cellulose formate. This enhanced reactivity of poly alpha-1,3-glucan with formic acid offers significant advantages compared to cellulose esters like cellulose acetate. Cellulose esters have to be synthesized in a separate reaction, the product has to be recovered, dried and then redissolved in a different solvent system to produce a solution for film casting. This is not required for the production of poly alpha-1,3-glucan formate.

The glucan monomer has 3 functional —OH groups that can be derivatized to form the formate ester. This gives a maximum degree of substitution (DoS) of 3. The poly alpha-1,3-glucan is mixed into the solvent by application of shear to obtain clear solutions. At the initial stages of the reaction, the polymer granules swell. For high molecular weight polymer in solutions with polymer concentration of about 10 wt %, the swollen mixture has high viscosity and appears to be like a 'gel'. Over time, most likely due to increased derivatization of the polymer, the solubility of the polymer in formic acid increases and the polymer dissolves into the solution to form a clear, free-flowing solution. The poly alpha-1,3-glucan is dissolved in the solvent composition at a concentration from about 5 wt % to about 20 wt %, more preferably about 6 wt % to about 15 wt % and most preferably about 7 wt % to about 10%. The glucan monomer has 3 functional groups that can be derivatized with formate. It should be noted that the process of the invention can produce a poly alpha-1,3-glucan formate film with a DoS of formate of 3 or less depending on reaction conditions. The DoS of formate comprises from at least about 0.1 to 3, preferably from at least about 0.2 to at most about 2.5, more preferably from at least about 0.3 to at most about 2.0 and most preferably from at least about 0.4 to about 1.5. The solubility of poly alpha-1,3-glucan formate in the solvent system is dependent on, in addition to other factors, the DoS as well as the composition of the solvent system. The lower the formic acid content in the solvent mixture, the longer the polymer takes to go into solution. The kinetics for dissolution of the glucan polymer is dependent on the relative ratio of formic acid to glucan in the starting mixture, the shear rate during mixing as well as the water content of the starting mixture. It may also depend on the initial particle size. For example, an initial mixture composition of 10% polymer in a solvent composition of 90% formic acid, 10% water dissolves to form a clear solution in approximately 18 hours with overhead stirring. The degree of substitution of the polymer at this point is approximately 1.6 to 1.8. However, an initial mixture composition of 6% polymer in a solvent composition of 80% formic acid, 20% water may take more than 40 hours to form a solution with overhead stirring. The degree of substitution of the polymer at this time is approximately 0.9. It is believed that the polymer goes into solution once the degree of substitution of the polymer is high enough such that it can dissolve in the solvent composition. The rate of substitution depends on the initial solvent composition as well. The solvent composition used to make the mixture comprises preferably at least about 80% formic acid and at most about 20% water and more preferably at least about 87% formic acid and at most about 13% water and most preferably at least about 90% formic acid and at most 10% water. However, formation of solutions with solvent compositions below 80% formic acid may be possible, but since the rate of substitution will likely be reduced, longer dissolution times or increasing the rate of reaction by heat or increased shear may be needed. As the reaction proceeds, the concentration of formic acid in the solution decreases while the concentration of water in the solution increases. A polymer solution with solvent composition of 90% formic acid and 10% water can be achieved in three different ways, and the procedure used impacts the final solution and film properties. In the first method, the polymer is slurried in water, and formic acid is added to achieve a solvent mixture of 90% formic acid and 10% water. In the second method, a mixture composed of 90% formic acid and 10% water is prepared and the polymer is added to this mixture. In the third method, the polymer solution is made by using an initial solvent composition of 99.9% formic acid, mixing the polymer until dissolution and then adding water to achieve a final solvent of 90% formic acid and 10% water. The differences in the solution and film properties are likely due to difference in initial dispersion of the polymer phase and differences in the degree and distribution of substituted groups on the polymer backbone. It was observed that films formed using the solution prepared by the third method had a softer hand-feel.

After creating a solution by one of these means, the solution of poly alpha-1,3-glucan formate is contacted with a surface. Typically the films are produced by casting the solution onto a substrate using a rod coater or a draw down coater but can also be produced by other solution film casting methods such as extrusion through a slot die. The substrates include but are not limited to glass (coated with or without surfactant). The solvent composition is removed to form a poly alpha-1,3-glucan formate film. The solvent composition may be removed by a series of steps that may include drying, coagulation, washing and subsequent air-drying followed by peeling the film off of the substrate. The film may be heated. Generally, the solvent composition can be removed by evaporation at room temperature or elevated temperature and at room pressure or reduced pressure. Further removal of formic acid solvent from the film may be obtained by washing the film with water. The washed film is subsequently dried. The exact sequence of steps is varied to get films of different properties.

The degree of substitution of the glucan formate groups can be decreased by soaking the film in dilute sulfuric acid, where the extent of the soak time and the concentration of the bath controls the reduction in the DoS. The formyl groups may also be removed by heat treatment, such as by boiling in water or by other saponification methods such as treatment with dilute bases. It should be noted that depending on the solvent composition removal technique, some residual solvent composition or its' constituents may be present in small amounts. Thus some amount of residual formic acid and water may be left behind in the film. The films thus obtained are clear and transparent. The films with low formate content can be swollen by water. They can have a glossy or a matte appearance. They are flexible and exhibit good dead fold characteristics. They can be twisted and dyed. The films can be used as packaging films. One application of cellulose tri-acetate films is as protective layers for polarizer films for electronic applications. Low birefringence in films is a critical property for this application. Refractive indices measurements on glucan formate films show that the in-plane birefringence of the films is about 0.005, while the out-of-plane birefringence is 0.002 or less. It is believed that the birefringence can be further reduced by change in film casting parameters.

In another embodiment of the present invention, poly alpha-1,3-glucan film can be made from poly alpha-1,3-glucan formate film by removing the formate. The formate degree of substitution can be reduced by treating the film with sulphuric acid or by other methods such as saponification treatment with dilute bases or by wet heat. Submerging the films in aqueous basic buffer solutions was found to reduce the DoS, here the extend of reduction depended on the pH and the soaking time. Submerging the films in aqueous sulfuric acid solutions were also found to reduce the DoS. Wet heat implies subjecting the films to heat in the presence of excess moisture, such as boiling in water. Without wishing to be bound by such theory, it is believed that the presence of water and heat may drive the reverse esterification reaction, resulting in reduction of DoS of the films. The residual formic acid in the film may also assist the hydrolysis and removal of the formate ester.

The present invention is also directed toward a film comprising poly alpha-1,3-glucan formate and chitosan or chitosan formate. The term "chitosan" refers to a family of copolymers, composed of two types of monomers as shown below

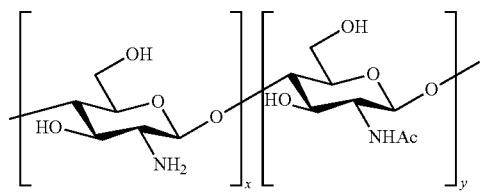

Where the sum of x and y total at least 8 and the value of x is at least 10% of the total. Chitosan is a polysaccharide made by deacetylating chitin, often derived from crustacean shells. Chitosan is a random copolymer of beta-1,4-D-glucosamine and N-acetyl-D-glucosamine. Chitosan is soluble in aqueous formic solutions and forms a solution over a wide range of compositions. Thus blend solutions containing both chitosan and poly alpha-1,3-glucan can be prepared in formic acid. Furthermore films cast from these blend solutions are transparent. Thus, as the film is cast and dried, phase separation does not occur. This is important for packaging films because if phase separation occurs during drying, the film would not be transparent. In contrast, solution blends of with poly alpha-1,3-glucan with nylon were found to result in hazy or opaque films upon drying. Furthermore, strength of the blend films were found to be acceptable for packaging applications.

The present invention is also directed toward a process for making a film of poly alpha-1,3-glucan formate and chitosan formate comprising: (a) dissolving poly alpha-1,3-glucan in a formic acid and water solvent composition to provide a solution of poly alpha-1,3-glucan formate; (b) dissolving chitosan, either in dry form or as a pre-dissolved chitosan-formic acid solution, into the solution formed in part (a); (c) contacting the solution of poly alpha-1,3-glucan formate and chitosan formate with a surface; and (d) removing the solvent composition to form a film of poly alpha-1,3-glucan formate and chitosan formate.

In another embodiment, the present invention is directed toward a film comprising poly alpha-1,3-glucan and chitosan.

The present invention is also directed toward a process for making a film of poly alpha-1,3-glucan and chitosan formate comprising: (a) dissolving poly alpha-1,3-glucan in a formic acid and water solvent composition to provide a solution of poly alpha-1,3-glucan formate; (b) dissolving chitosan, either in dry form or as a pre-dissolved chitosan-formic acid solution, into the solution formed in part (a); (c) contacting the solution of poly alpha-1,3-glucan formate and chitosan with a surface; (d) removing the solvent composition to form a film of poly alpha-1,3-glucan formate and chitosan and (e) removing the formate in the film of poly alpha-1,3-glucan formate and chitosan to form the film of poly alpha-1,3-glucan and chitosan.

Chitosan is added to the solution by any convenient method. Being readily soluble in even dilute formic acid, chitosan could be predissolved and blended as a solution into another solution of poly alpha-1,3-glucan in formic acid. It could also added as a powder to a poly alpha-1,3-glucan solution in formic acid and then mixed in. The order of addition and the time that the two polymers are respectively exposed to higher concentrations of formic acid are expected to change the degree of substitution of formate in the final formate film, and thereby affects film properties.

This invention relates to a film comprising poly alpha-1,3-glucan formate. The poly alpha-1,3-glucan formate can have a formate degree of substitution (DoS) from about at least 0.1 to 3. The film can have at least one of: (a) haze less than about 10%; and (b) tensile strength from about 10 to about 60 MPa. The film can further comprise chitosan formate. The film can be used as a packaging film.

This invention also relates to a process for making a poly alpha-1,3-glucan formate film comprising: (a) dissolving poly alpha-1,3-glucan in a formic acid and water solvent composition to provide a solution of poly alpha-1,3-glucan formate; (b) contacting the solution of poly alpha-1,3-glucan formate with a surface; and (c) removing the solvent composition to form a poly alpha-1,3-glucan formate film. The poly alpha-1,3-glucan can be dissolved in the solvent composition at a concentration from about 5 wt % to about 20 wt %. The solvent composition can comprise at least about 80% formic acid and at most about 20% water. The solvent composition can be removed by: (a) evaporation at room temperature or elevated temperature and at room pressure or reduced pressure; (b) optionally rinsing the film with water; and (c) optionally repeating step (a). The process can further comprise dissolving chitosan, either in dry form or as a pre-dissolved chitosan-formic acid solution, into the solution formed in part (a) dissolving poly alpha-1,3-glucan in a formic acid and water solvent composition to provide a solution of poly alpha-1,3-glucan formate thereby forming a poly alpha-1,3-glucan formate and chitosan formate film in part (c).

The invention further relates to a film comprising poly alpha-1,3-glucan. The film can further comprise chitosan.

The invention still further relates to a process for making a poly alpha-1,3-glucan film comprising: (a) dissolving poly alpha-1,3-glucan in a formic acid and water solvent composition to provide a solution of poly alpha-1,3-glucan formate; (b) contacting the solution of poly alpha-1,3-glucan formate with a surface; (c) removing the solvent composition to form a poly alpha-1,3-glucan formate film; and (d) removing the formate in the poly alpha-1,3-glucan formate film to form the poly alpha-1,3-glucan film. The poly alpha-1,3-glucan can be dissolved in the solvent composition at a concentration from about 5 wt % to about 20 wt %. The solvent composition can comprise at least about 80% formic acid and at most about 20% water. The solvent composition can be removed by evaporation at room temperature or elevated temperature and at room pressure or reduced pressure. The formate in the poly alpha-1,3-glucan formate film can be removed by washing the poly alpha-1,3-glucan formate film with aqueous sulfuric acid, wet heating or by treatment with aqueous basic solutions. The process can further comprise dissolving chitosan, either in dry form or as a pre-dissolved chitosan-formic acid solution, into the solution formed in part (a) dissolving poly alpha-1,3-glucan in a formic acid and water solvent composition to provide a solution of poly alpha-1,3-glucan formate thereby forming a poly alpha-1,3-glucan and chitosan film in part (d).

Test Methods

In the non-limiting examples that follow, the following test methods were employed to determine various reported characteristics and properties.

Degree of Polymerization (DPw) and Polydispersity Index (PDI) were determined by Multidetector Size Exclusion Chromatography (SEC) method. The chromatographic system used was Alliance™ 2695 separation module from Waters Corporation (Milford, Mass.) coupled with three on-line detectors: differential refractometer (DR) 2410 from Waters, multiangle light scattering photometer Heleos™ 8+ from Wyatt Technologies (Santa Barabara, Calif.) and differential capillary viscometer ViscoStar™ from Wyatt. The software packages used for data reduction were Empower™ version 3 from Waters (column calibration with broad glucan standard, DR detector only) and Astra version 6 from Wyatt (triple detection method without column calibration). Four SEC styrene-divinyl benzene columns from Shodex (Japan) were used—two linear KD-806M, KD-802 and KD-801 to improve resolution at low molecular weight region of a polymer distribution. The mobile phase was N,N'-Dimethyl Acetamide (DMAc) from J. T Baker, Phillipsburg, N.J. with 0.11% LiCl (Aldrich, Milwaukee, Wis.). The chromatographic conditions were as follows: temperature at column and detector compartments: 50° C., temperature at sample and injector compartments: 40° C., flow rate: 0.5 ml/min, injection volume: 100 ul. The sample preparation targeted 0.5 mg/mL sample concentration in DMAc with 5% LiCl, shaking overnight at 100° C. After dissolution, polymer solution can be stored at room temperature. This method was used to measure molecular characteristics of glucan polymers (average molecular weights and degree of polymerization, molecular weight distribution and PDI).

Degree of Substitution (DoS) was determined from $^1$H nuclear magnetic resonance spectroscopy (NMR) and IR analysis. Approximately 10 mg of the polymer sample was weighed into a vial on an analytical balance. The vial was removed from the balance and 0.8 mL of deuterated trifluoroacetic acid was added to the vial. A magnetic stir bar was added to the vial and the mixture was stirred until the solid sample dissolves. Deuterated benzene (C6D6), 0.2 mL, was then added to the vial in order to provide a better NMR lock signal than the TFA,d would provide. A portion, 0.8 mL, of the solution was transferred, using a glass pipet, into a 5 mm NMR tube. A quantitative $^1$H NMR spectrum was acquired using an Agilent VnmrS 400 MHz NMR spectrometer equipped with a 5 mm Auto switchable Quad probe. The spectrum was acquired at a spectral frequency of 399.945 MHz, using a spectral window of 6410.3 Hz, an acquisition time of 1.278 seconds, an inter-pulse delay of 10 seconds and 124 pulses. The time domain data was transformed using exponential multiplication of 0.78 Hz. Two regions of the resulting spectrum were integrated; from 3.1 ppm to 6.0 ppm, that gives the integral for the 7 protons on the poly alpha-1,3-glucan ring, and from 7.7 ppm to 8.4 ppm that gives the integral for the protons on the formate group. The degree of substitution was calculated by dividing the formate protons integral area by one seventh of the poly alpha-1,3-glucan ring protons integral area. For estimation of formyl content using Perkin-Elmer Universal ATR sampling accessory and the data analyzed using Spectrum software. The relative ratios of the intensities of the IR signals corresponding to the glucan ring backbone (peak position ~1015) and peak corresponding to the C=O carbonyl stretch of the formyl group located at 1713 were calculated and were used as a measure of DoS using IR analysis.

Film Clarity was determined using an Agilent (Varian) Cary 5000 uv/vis/nir spectrophotometer equipped with a DRA-2500 diffuse reflectance accessory in transmission mode. The DRA-2500 is a 150 mm integrating sphere with a Spectralon® coating. Total and diffuse transmission for the instrument and the samples are collected over the wavelength range of 830 nm to 360 nm. The calculations are made in accordance with ASTM D1003 using a 2 degree observer angle and illuminant C (represents average daylight, color temperature 6700K).

Thickness of the film was determined using a Mitutoyo micrometer, No. 293-831 and reported in mm.

Tensile Properties were measured on an Instron 5500R Model 1122, using 1" grips, and a 1" gauge length, in accordance with ASTM D882-09. Tensile strength and toughness was reported in MPa and maximum strain was reported in %.

Oxygen Permeability was measured according to ASTM F 1927 at 75° F. 0% RH and reported in cc/[m²-day].

EXAMPLES

Preparation of Poly Alpha-1,3-Glucan

Poly alpha-1,3-glucan using a gtfJ enzyme preparation, was prepared as described in the co-pending, commonly owned U.S. Patent Application Publication No. 2013/0244288, which is incorporated herein by reference.

Materials

Formic acid was from Sigma Aldrich (St. Louis, Mo.). Sulphuric acid was obtained from EMD Chemicals (Billerica, Mass.).

The Following Abbreviations were Used in the Examples

"DI water" is deionized water; "MPa" is megapascal; "mm" is millimeters; "ml" is millilters; "mg" is milligrams; "wt %" is weight percent; "gsm" is grams per square meter; "cm" is centimeter; "DPw" is weight average degree of polymerization. "IR" is infrared spectroscopy; "NMR" is nuclear magnetic resonance; "DoS" refers to degree of substitution.

Example 1a

Glucan Formate Film with Low Molecular Weight Polymer (DPw 550)

Poly alpha-1,3-glucan with a DPw of 550 was dissolved in 90% formic acid and 10% deionized water (DI) water by stirring over night to make a 10 wt % polymer solution. The solution was centrifuged to remove any air bubbles. The solution was cast on to a glass plate using a ChemInstruments Custom Coater EC-300 and a 0.254 mm Meyer wire wound casting rod. The solution was air dried to form a film. The film was washed in successive water baths until the water bath pH remained neutral. Finally, the film was air dried.

The resulting film was clear, had a haze of 1.5%, had a thickness of 0.019 mm and a tensile strength of 40 MPa. The degree of substitution (DoS) of formate in the film measured using $^1$H NMR was found to be 0.88.

Example 1b

Glucan Formate Film with High Molecular Weight Polymer (DPw 1050)

Poly alpha-1,3-glucan with a DPw of 1050 was slurried in DI water, then a mixture of formic acid in DI water was added. The final solution composition was 10 wt % polymer in a solution composition of 90% formic acid and 10% DI water. The solution was stirred and the viscosity increased significantly forming a thick gel-like consistency. The stirring was stopped and solution was left to stand until the viscosity of the solution had decreased and the solution was pourable. A film was cast, air dried, soaked in water and air dried as in Example 1a.

The resulting film was clear, had a thickness of 0.023 mm, a tensile strength of 30 MPa, a maximum strain of 6.5% and a toughness of 1.17 MPa. The DoS of formate in the film measured using $^1$H NMR and was found to be 1.26.

Example 1c

Glucan Formate Film with High Molecular Weight Polymer (DPw 1250)

Poly alpha-1,3-glucan with a DPw of 1250 was mixed with a 90% solution of formic acid and DI water. The mixture composition was 10 wt % polymer, 81% formic acid and 9% DI water. The solution was stirred and the viscosity increased significantly forming a thick gel-like consistency. The stirring was allowed to continue for 18 hours during which the solution viscosity decreased and the solution became pourable. Films were cast, coagulated in water, rinsed 3 times with water and air dried.

The resulting film was clear, had a thickness of 0.023 mm, a tensile strength of 40 MPa, a maximum strain of 13.1% and a toughness of 36 MPa. The DoS of formate in the film measured using $^1$H NMR and was found to be 1.2.

Example 2a

Glucan Formate Film with Low Molecular Weight Polymer and Acid Treatment

The film of Example 2a was prepared in a similar manner to the film of Example 1a except the film was treated with sulfuric acid to reduce the DoS of formate in the film. After the film was initially air dried but before soaking in a water bath as in Example 1a, the film was soaked in a 5% sulfuric acid bath for 1 hour.

The resulting film was clear, had a thickness of 0.020 mm and a tensile strength of 35 MPa. The DoS of formate in the film measured using $^1$H NMR and was found to be 0.43.

Comparing the DoS of the films from Example 1a and Example 2a demonstrated that the sulfuric acid treatment reduced the amount of formate in the film.

Example 2b

Glucan Formate Film with High Molecular Weight Polymer and Acid Treatment

The film of Example 2b was prepared in a similar manner to the film of Example 1b.

The resulting film was clear, had a thickness of 0.023 mm, a tensile strength of 30 MPa, a maximum strain of 6.0% and a toughness of 1.20 MPa. The degree of substitution (DoS) of formate in the film measured using $^1$H NMR was found to be 1.26.

The film was then divided into two halves. The first half was soaked in 5% sulfuric acid for 30 minutes. It was removed from the bath and washed in water. IR spectra was then obtained on the film and it was found that the substitution decreased by about 40% of the original substitution.

The film was then returned to the sulfuric acid bath for an additional 30 minutes, then washed with water. Substitution decrease to about 50% of the starting formate measurement. The film was then soaked in sulfuric acid bath overnight. IR did not detect any formate substitution. The resulting film was clear, had a thickness of 0.023 mm, exhibited a tensile strength of 50 MPa, a maximum strain of 18% and a toughness of 4.9 MPa.

The second half of the film was then soaked in 10% sulfuric acid for 5 hours. It was removed from the bath and washed in water. The DoS of formate in the film measured using $^1$H NMR and was found to be 0.28. Thus the DoS went down from 1.26 before sulfuric acid soak to 0.28 after sulfuric acid soak. The resulting film was clear, had a thickness of 0.023 mm, a tensile strength of 33 MPa, a maximum strain of 11% and a toughness of 2.1 MPa.

The sulfuric acid treated films demonstrated that the sulfuric acid treatment reduced the amount of formate substitution in the films.

Example 3

Glucan Formate Film with Low Molecular Weight Polymer as an Oxygen Barrier Packaging Material Poly alpha-1,3-glucan with a DPw of 550 was dissolved in 90% formic acid and 10% DI water by stirring over night to make a 7 wt % polymer solution. The solution was aged 24 hours. A film was cast using a ChemInstruments Custom Coater EC-300 and a 0.254 mm Meyer wire wound casting rod. The film was then immersed in a water bath for three days. Then the film was air dried. The film was soaked in 5% sulfuric acid for 4 minutes. The film was then rinsed in water several times until the pH of the rinse water remained neutral. Finally, the film was air dried.

The resulting film was clear, had a thickness of 0.015 mm. The barrier properties of the film in terms of permeability to oxygen were measured. The oxygen permeation rate was found to be 9.25 cc/[m$^2$-day].

Example 4a

Glucan Formate Film with Reduction of Degree of Substitution by Heating in Presence of Residual Acid/Water The film of Example 4a was prepared in a similar manner to the film of Example 3a. Films prepared by this technique may have residual formic acid content of about 5 wt % as well as residual water content. The film was heated from 30° C. to 250° C. at 5° C./minute followed by a 5 minute hold at 250° C.

IR spectra of the film was collected before and after heating. The IR spectra showed that the DoS of formate in the film was reduced by 20%. This demonstrates that formate content of the film may be reduced by heating, particularly in the presence of residual formic acid and residual water.

Example 4b

Glucan Formate Film with Reduction of Degree of Substitution by Boiling in Water Poly alpha-1,3-glucan with a DPw of 1250 was mixed with a 95% solution of formic acid and DI water. The final solution composition was 7.5 wt % polymer, 88% formic acid and 4.5% DI water. The solution was stirred and the viscosity increased significantly forming a thick gel-like consistency. The stirring was allowed to continue for 22 hours during which the solution viscosity decreased and the solution became pourable. Films were cast, coagulated in water, rinsed 3 times with water and air dried.

The resulting film was clear, had a thickness of 0.023 mm, a tensile strength of 37.6 MPa and a maximum strain of 7.26%. The DoS of formate in the film measured using $^1$H NMR and was found to be 1.34. The NMR spectra also showed presence of residual formic acid in the film.

The film was then boiled in water for 3 hours. The film remained clear, had a thickness of 0.024 mm, a tensile strength of 20.7 MPa and a maximum strain of 7.37%. The DoS of formate in the film measured using $^1$H NMR and was found to be 0.65. This demonstrates that formate content of the film may be reduced by boiling in water, particularly in the presence of residual formic acid.

Example 5a

Glucan Formate Film with Reduction of Degree of Substitution by Extended Base Treatment Poly alpha-1,3-glucan with a DPw of 800 was mixed with a 90% solution of formic acid and DI water. The final solution composition was 10 wt % polymer, 81% formic acid and 9% DI water. The solution was stirred and the viscosity increased significantly forming a thick gel-like consistency. The stirring was allowed to continue for 18 hours during which the solution viscosity decreased and the solution became pourable. A film was cast on glass and air dried. After thoroughly drying for 2 hours, the films were rinsed twice with water and peeled from the glass substrate they were cast on.

The resulting film was clear, had a thickness of 0.024 mm, a tensile strength of 70.9 MPa and a maximum strain of 17.5%. The DoS of formate in the film measured using H NMR and was found to be 1.28. The film was then placed in a buffer solution of pH 10 for 18 hours. The film was rinsed with water and allowed to air dry. The resulting film was clear, had a thickness of 0.024 mm, a tensile strength of 63.7 MPa and a maximum strain of 26.1%. The DoS of formate in the film measured using $^1$H NMR and was found to be 0.1. Another film with an initial DoS of 1.1 was soaked in a buffer solution of pH 10 for 18 hours. The film was rinsed with water and allowed to air dry. The DoS of formate in the film measured using $^1$H NMR and was found to be 0. This demonstrates that formate content of the film may be reduced by treatment with a base.

Example 5b

Glucan Formate Film with Reduction of Degree of Substitution by Rinsing with Aqueous Base Poly alpha-1,3-glucan with a DPw of 800 was mixed with a 95% solution of formic acid and DI water. The final solution composition was 10 wt % polymer, 85.5% formic acid and 4.5% DI water. The solution was stirred and the viscosity increased significantly forming a thick gel-like consistency. The stirring was allowed to continue for 21 hours during which the solution viscosity decreased and the solution became pourable. A film was cast on glass, coagulated in water until it remained neutral and air dried. The resulting film was clear. The DoS of formate in the film measured using $^1$H NMR and was found to be 1.47.

An additional films was cast on glass, coagulated in water, washed in a 0.1% NaOH bath for 1 minute, then rinsed in water until neutral. The resulting film was clear. The DoS of formate in the film measured using $^1$H NMR and was found to be 1.1.

Example 6

Preparation of Glucan Formate and Chitosan Formate Blend Films

Poly alpha-1,3-glucan with a DPw of 1050 was slurried in DI water, then a mixture of formic acid in DI water was added. The final solution composition was 10 wt % polymer in a solution composition of 90% formic acid and 10% DI water. The solution was stirred and the viscosity increased significantly forming a thick gel-like consistency. The stirring was stopped and solution was left to stand for 20 days. After which time, the viscosity of the solution had decreased and the solution was pourable. The solution viscosity was estimated by noting the solution level in the centrifuge tube, inverting the tube and measuring time for solution to reach the 45 ml mark on the tube. The time for this solution was measured to be 1 sec. To 14.2 gm of this solution, 0.7 gm of Chitosan (Chito-clear LV 25 1410) was dissolved. The weight ratio of chitosan:glucan in the solution was estimated to be approximately 0.5. The solution was centrifuged to remove any air bubbles. The viscosity was again estimated using the above mentioned technique and the time was found to be 61 sec. A film was cast using a ChemInstruments Custom Coater EC-300 and a 0.508 mm Meyer wire wound casting rod. The film was air dried. The film was then dipped in water to peel off the glass plate. Finally, the film was air dried.

The resulting film was clear, had a thickness of 0.033 mm, maximum strain of 5.9%, and a tensile strength of 50 MPa.

Example 7

Glucan Formate Film with Solvent Composition of 80% Formic Acid, 20% Water

Ten gm of Poly alpha-1,3-glucan with a DPw of 800 was mixed with 190 gm of a solution of 80% formic acid and 20% DI water in a 500 mL round bottom flask. The solution was stirred for 5 days during which the powder dissolved to form a flowing, slightly hazy solution. The solution was cast using a 0.381 casting rod. The solution was air dried to form a film, rinsed 3 times with water and air dried.

The resulting film was clear, had a thickness of 0.023 mm, a tensile strength of 33 MPa, a maximum strain of 5.1%. The DoS of formate in the film measured using $^1$H NMR and was found to be 0.97.

What is claimed is:

1. A film comprising poly alpha-1,3-glucan formate, wherein the poly alpha-1,3-glucan formate has a formate degree of substitution (DoS) from at least 0.1 to 3, and wherein the film has at least one of:
   (a) haze less than 10%; and
   (b) tensile strength from 10 to 60 MPa.
2. The film according to claim 1, wherein the film further comprises chitosan formate.
3. The film according to claim 2, wherein the film is a packaging film.
4. The film according to claim 1, wherein the film is a packaging film.
5. A process for making a poly alpha-1,3-glucan formate and chitosan formate film comprising:
   (a) dissolving poly alpha-1,3-glucan in a formic acid and water solvent composition to provide a solution of poly alpha-1,3-glucan formate;
   (b) dissolving chitosan, either in dry form or as a pre-dissolved chitosan-formic acid solution, into the solution formed in part (a)
   (c) contacting the solution of poly alpha-1,3-glucan formate and chitosan formate with a surface; and
   (d) removing the solvent composition to form a film of poly alpha-1,3-glucan formate and chitosan formate.
6. The process according to claim 5, wherein the poly alpha-1,3-glucan is dissolved in the solvent composition at a concentration from 5 wt % to 20 wt %.
7. The process according to claim 5, wherein the solvent composition comprises at least 80% formic acid and at most 20% water.
8. The process according to claim 5, wherein the solvent composition is removed by:
   (a) evaporation at room temperature or elevated temperature and at room pressure or reduced pressure;
   (b) optionally rinsing the film with water; and
   (c) optionally repeating step (a).
9. A process for making a poly alpha-1,3-glucan film comprising:
   (a) dissolving poly alpha-1,3-glucan in a formic acid and water solvent composition to provide a solution of poly alpha-1,3-glucan formate;
   (b) contacting the solution of poly alpha-1,3-glucan formate with a surface;
   (c) removing the solvent composition to form a poly alpha-1,3-glucan formate film; and
   (d) removing the formate in the poly alpha-1,3-glucan formate film to form the poly alpha-1,3-glucan film.
10. The process according to claim 9, wherein the poly alpha-1,3-glucan is dissolved in the solvent composition at a concentration from 5 wt % to 20 wt %.
11. The process according to claim 9, wherein the solvent composition comprises at least 80% formic acid and at most 20% water.
12. The process according to claim 9, wherein the solvent composition is removed by evaporation at room temperature or elevated temperature and at room pressure or reduced pressure.
13. The process according to claim 9, wherein the formate in the poly alpha-1,3-glucan formate film is removed by washing the poly alpha-1,3-glucan formate film with aqueous sulfuric acid, wet heating or by treatment with aqueous basic solutions.
14. The process according to claim 9, wherein the process further comprises dissolving chitosan, either in dry form or as a pre-dissolved chitosan-formic acid solution, into the solution formed in part (a) thereby forming a poly alpha-1,3-glucan and chitosan film in part (d).

* * * * *